(12) United States Patent
Muyldermans et al.

(10) Patent No.: US 11,760,826 B2
(45) Date of Patent: Sep. 19, 2023

(54) BLOCK COPOLYMERS AND USES THEREOF

(71) Applicant: Kraton Polymers LLC, Houston, TX (US)

(72) Inventors: Xavier Daniel Muyldermans, Mont Saint Guibert (BE); Marianne Stol, Amsterdam (NL); Martine Dupont, Mont Saint Guibert (BE); Koen Van Duin, Amsterdam (NL)

(73) Assignee: KRATON CORPORATION, Houston, TX (US)

( * ) Notice: Subject to any disclaimer, the term of this patent is extended or adjusted under 35 U.S.C. 154(b) by 910 days.

(21) Appl. No.: 16/714,188

(22) Filed: Dec. 13, 2019

(65) Prior Publication Data

US 2020/0190375 A1    Jun. 18, 2020

Related U.S. Application Data

(60) Provisional application No. 62/779,515, filed on Dec. 14, 2018.

(51) Int. Cl.
| | |
|---|---|
| *C08F 297/04* | (2006.01) |
| *C08L 53/02* | (2006.01) |
| *B60C 1/00* | (2006.01) |
| *B60C 11/00* | (2006.01) |
| *C09J 153/02* | (2006.01) |

(52) U.S. Cl.
CPC ........ *C08F 297/046* (2013.01); *B60C 1/0016* (2013.01); *B60C 11/0008* (2013.01); *C08F 297/048* (2013.01); *C08L 53/02* (2013.01); *C09J 153/02* (2013.01); *B60C 2011/0025* (2013.01)

(58) Field of Classification Search
CPC ............... B60C 1/0016; B60C 11/0008; B60C 2011/0025; C08F 297/046; C08F 297/048; C08F 8/04; C08L 53/02; C08L 9/06; C09J 153/02
See application file for complete search history.

(56) References Cited

U.S. PATENT DOCUMENTS

| | | |
|---|---|---|
| 9,403,406 B2 | 8/2016 | Custodero et al. |
| 9,416,212 B1 | 8/2016 | Dos Santos Freire |
| 2012/0065292 A1 | 3/2012 | Lopitaux et al. |
| 2014/0011929 A1 | 1/2014 | Knoll et al. |
| 2015/0034226 A1 | 2/2015 | Abad et al. |
| 2019/0016842 A1* | 1/2019 | Kamei .................. B32B 27/065 |

FOREIGN PATENT DOCUMENTS

| | | |
|---|---|---|
| EP | 1474495 B1 | 6/2006 |
| WO | 2014/041167 A1 | 3/2014 |

* cited by examiner

*Primary Examiner* — Angela C Scott

(57) ABSTRACT

A styrenic block copolymer is disclosed, having a formula, A-B-A, A-B-B-A, (A-B-A)$_n$X, (A-B)$_n$X or mixtures thereof, wherein n is from 2 to 30, and X is residue of a coupling agent. Each A block is independently a polystyrene having 10-63 wt. % 1,1-diphenylethylene, a GPC peak molecular weight from about 5-40 kg/mol, and forms 10-40 wt. % of the copolymer. Each B block is independently a poly(1,3-diene-co-styrene) comprising: (i) >90 wt. % of polymerized isoprene units relative to the weight of the polymerized 1,3-diene, where S is <40, and (S+V) is 18-75; (ii) >90 wt. % of polymerized butadiene units relative to the weight of the polymerized 1,3-diene, where S is <40, and (1.2*S+V) is 60-120; or combinations thereof "S" represents the polystyrene content, and "V" represents the 1,3-diene content having pendant 1,2- and/or 3,4-vinyl groups in the B block.

17 Claims, 1 Drawing Sheet

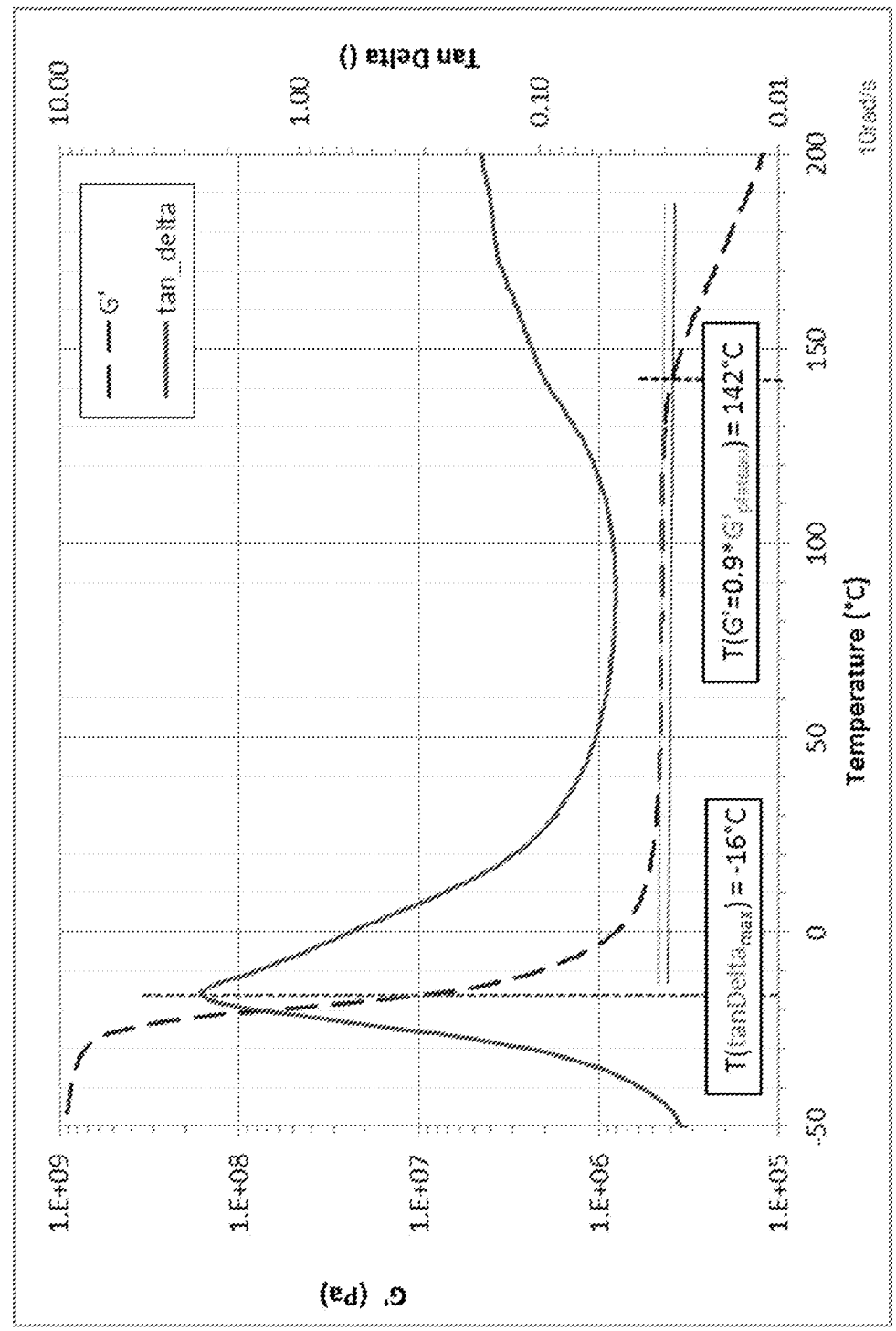

BLOCK COPOLYMERS AND USES THEREOF

RELATED APPLICATIONS

This application claims priority from U.S. Provisional Application No. 62/779,515, with a filing date of Dec. 14, 2018, the disclosures is incorporated herein by reference.

FIELD

The present disclosure relates to novel block copolymers and their uses.

BACKGROUND

High temperature performance in rubbery materials has been achieved mainly by the use of cured rubbers. However, the curing process entails costs such as process costs and manpower costs, and also sometimes leads to generation of non-recyclable finished products and/or side products. Therefore, there is a need for polymer compositions which have suitable mechanical and thermal performance and that do not need a curing step.

SUMMARY

One aspect of the disclosure is a styrenic block copolymer having one or more polymer blocks A and one or more polymer blocks B, and having a formula, A-B-A, A-B-B-A, $(A-B-A)_nX$, $(A-B)_nX$ or mixtures thereof, wherein n is from 2 to 30, and X is residue of a coupling agent. The block copolymers containing at least two blocks A connected by at least one block B represent more than 50 wt. % of the styrenic block copolymer. Each A block is independently a polystyrene block having a 1,1-diphenylethylene content from about 10 wt. % to about 63 wt. %, relative to the weight of the A block. The A block has a GPC peak molecular weight from about 5 kg/mol to about 40 kg/mol; and a weight content relative to the weight of the styrenic block copolymer, of about 10 wt. % to about 40 wt. %. Each B block is independently a poly(1,3-diene-co-styrene) block having a wt. % styrene content of S relative to the total weight of the B blocks; and a wt. % 1,3-diene content having pendant 1,2- and/or 3,4-vinyl groups of V, relative to the total weight of the polymerized 1,3-diene in the one or more B blocks. The poly(1,3-diene-co-styrene) block comprises (i) more than 90 wt. % of polymerized isoprene units relative to the weight of the polymerized 1,3-diene, wherein S is from 0 to about 40, and (S+V) is from about 18 to about 75; (ii) more than 90 wt. % of polymerized butadiene units relative to the weight of the polymerized 1,3-diene, wherein S is from 0 to about 40, and (1.2*S+V) is from about 60 to about 120; or combinations of (i) and (ii).

In another aspect, the styrenic block copolymer described above further comprises one or more C blocks, wherein the C block is between the A block and the B block, and is a poly(1,3-diene) block substantially free of styrene units. The B and C blocks together comprise a wt. % styrene content of $S_1$ relative to the weight of the B and C blocks; and a wt. % 1,3-diene content having pendant 1,2- and/or 3,4-vinyl groups of $V_1$, relative to the weight of the polymerized 1,3-diene in the B and C blocks. The B and C blocks together comprise (i) more than 90 wt. % of polymerized isoprene units relative to the weight of the polymerized 1,3-diene, wherein "$S_1$" is from 0 to about 40, and $(S_1+V_1)$ is from about 18 to about 75; (ii) more than 90 wt. % of polymerized butadiene units relative to the weight of the polymerized 1,3-diene, wherein "$S_1$" is from 0 to about 40, and $(1.2*S_1+V_1)$ is from about 60 to about 120; or combinations of (i) and (ii).

Another aspect of the disclosure is the styrenic block copolymer as above, which after hydrogenation has up to about 10 percent of the aromatic double bonds hydrogenated, and at least 80 percent of the 1,3-diene double bonds hydrogenated.

Still another aspect of the disclosure is a thermoplastic elastomer blend comprising 99 wt. % to 1 wt. % of the styrenic block copolymer of claim 1, and 1 wt. % to 99 wt. % of one or more components selected from: (a) at least one plasticizer, (b) at least one resin, (c) at least one additive, (d) at least one filler, and (e) at least one plastic material.

BRIEF DESCRIPTION OF THE DRAWINGS

FIG. 1 is an illustration of peak tan delta and rubbery elastic modulus plateau for a styrenic block copolymer.

DESCRIPTION

The following terms used the specification and will have the following meanings:

"Substantially free of polymerized styrene units" means the polymer block has a styrene content of less than 10 wt. %.

The disclosure provides styrenic block copolymers and their hydrogenated analogues that have good mechanical properties and are useful for high temperature applications, including adhesives. When they are used in polymer compositions for making articles, a curing step is not needed.

Styrenic Block Copolymer (SBC) Component:

The SBC component has a structure A-B-A, $(A-B-A)_nX$ or $(A-B)_nX$, or mixtures thereof, where n is an integer from 2 to 30, and X is residue of a coupling agent, and where the block copolymers containing at least two blocks A connected by at least one block B represent more than 50 wt. % of the SBC. The end-block A is a polystyrene block having repeat units derived from styrene and 1,1-diphenylethylene (DPE). In an embodiment, the A block has a DPE content from about 10 wt. % to about 63 wt. %, relative to the weight of the A block. The A block has a GPC peak molecular weight from about 5 kg/mol to about 40 kg/mol. The weight content of block A relative to the weight of the overall SBC is from about 10 wt. % to about 40 wt. %.

The B block is a poly(1,3-diene-styrene) block having repeat units derived from a 1,3-diene and styrene. The B block is a diene-rich block defined by parameters "S" and "V". "S" is the wt. % styrene content relative to the weight of the B block, and "V" is the wt. % content of polymerized 1,3-diene units having pendant 1,2- and/or 3,4-vinyl groups, relative to the total weight of the polymerized 1,3-diene in the B block. The poly(1,3-diene-styrene) block comprises either an isoprene-rich block, a butadiene-rich block or combinations of both types of blocks. The isoprene-rich block comprises more than 90 wt. % of polymerized isoprene units relative to the weight of the polymerized 1,3-diene, where "S" and "V" can assume values such that S is from 0 to about 40, and (S+V) is from about 18 to about 75. The butadiene-rich block comprises more than 90 wt. % of polymerized butadiene units relative to the weight of the polymerized 1,3-diene, where "S" and "V" can assume values such that "S" is from 0 to about 40, and (1.2*S+V) is from about 60 to about 120.

In another embodiment, the SBC has an A block having a DPE content from about 15 wt. % to about 60 wt. % relative to the weight of the A block, and a weight average molecular weight from about 10 kg/mol to about 25 kg/mol. The A block content relative to the weight of the overall SBC is about 13 wt. % to about 25 wt. %. In other embodiments, the SBC is one where the A block has a weight average molecular weight from about 13 kg/mol to 26 kg/mol.

In embodiments, the B block comprises more than 90 wt. % of polymerized isoprene units relative to the weight of the polymerized 1,3-diene, where "S" and "V" can assume values such that S is from 0 to about 25, and (S+V) is from about 25 to about 65. Alternately, the butadiene-rich block comprises more than 90 wt. % of polymerized butadiene units relative to the weight of the polymerized 1,3-diene, where "S" and "V" can assume values such that "S" is from 10 to about 30, and (1.2*S+V) is from about 60 to about 100. The B block can also comprise combinations of the foregoing isoprene-rich block and the butadiene-rich block.

In another embodiment, the SBC has a DPE content from about 20 wt. % to about 50 wt. %, relative to the weight of the A block, n is from about 2 to about 10, and X is residue of a coupling agent. The weight content of block copolymers that do not comprise the coupling residue (X) is less than 20 wt. % of the overall weight of the styrenic block copolymer.

In an embodiment, the SBC can further comprise one or more C blocks wherein the C block is located between the A block and the B block. The C block is a poly(1,3-diene) block substantially free of styrene units. Examples of SBCs that also have one or more C blocks include A-C-B-C-A and (A-C-B)$_n$X, wherein "n" and X are as previously defined. In such SBCs, the parameter $S_1$ defines the wt. % of styrene relative to the weight of the B and C blocks; and the parameter $V_1$ defines the wt. % of 1,3-diene that have pendant 1,2- and/or 3,4-vinyl groups, relative to the weight of the polymerized 1,3-diene in the B and C blocks. The B and C blocks together comprises either (i) an isoprene-rich block, (ii) a butadiene-rich block or combinations of both types of blocks. The isoprene-rich block comprises more than 90 wt. % of polymerized isoprene units relative to the weight of the polymerized 1,3-diene, where $S_1$ and $V_1$ can assume values such that $S_1$ is from 0 to about 40, and ($S_1+V_1$) is from about 18 to about 75. The butadiene-rich block comprises more than 90 wt. % of polymerized butadiene units relative to the weight of the polymerized 1,3-diene, where $S_1$ and $V_1$ can assume values such that $S_1$ is from 0 to about 40, and (1.2*$S_1+V_1$) is from about 60 to about 120. When the SBCs include one or more C blocks, each C block can independently have a wt. % content and molecular weight such that the above conditions defined by $S_1$ and $V_1$ are satisfied.

The SBC described above can also be hydrogenated to provide the corresponding hydrogenated block copolymers. In an embodiment, the hydrogenated SBC obtained from the unhydrogenated SBC has a structure where up to 10 percent of the aromatic double bonds have been hydrogenated, and at least 80 percent of the diene double bonds have been hydrogenated.

Suitable monoalkenyl arenes that can be co-polymerized with DPE for making the A block include those having 8 to 20 carbon atoms and include styrene, o-methylstyrene, p-methylstyrene, p-tert-butylstyrene, 2,4-dimethylstyrene, alpha-methylstyrene, vinylnaphthalene, vinyltoluene and vinylxylene, or mixtures thereof. Styrene is a preferred monoalkenyl arene.

Suitable conjugated dienes useful for constructing the diene-rich (1,3-diene-styrene) B block include those having from 4 to 8 carbon atoms, for example 1,3-butadiene, isoprene, 2,3-dimethyl-1,3-butadiene, 1,3-pentadiene and 1,3-hexadiene. The conjugated diene is isoprene in one embodiment, 1,3-butadiene in another embodiment, and mixtures of isoprene and 1,3-butadiene in yet another embodiment.

Preparation of the SBC:

The block copolymers are prepared by anionic polymerization using techniques known in the art. The polymerization initiator is generally an organometallic compound, such as organolithium compounds, example, ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyllithium, or polystyryllithium. The amount of initiator needed is calculated based on the molecular weight to be achieved, generally from 0.002 to 5 mol percent, based on the amount of monomer to be polymerized. Suitable solvents include aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, or suitable mixtures. Polymer chain termination is carried out using a coupling agent, such as bi- or polyfunctional compounds, for example divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkylsilicon methoxides, alkyl silicon ethoxides, polyfunctional aldehydes, such as terephthalic dialdehyde, ketones, esters, anhydrides or epoxides. For hydrogenated block copolymers, it is preferable to use 1,2-dibromoethane or diepoxides, in particular diglycidyl ethers, such as 1,4-butanediol diglycidyl ether.

If desired, a Lewis base additive, which affects polymerization parameters can also be employed. Examples of Lewis bases include dimethyl ether, diethyl ether, ethylene glycol dimethyl ether, 1,2-diethoxypropane, diethylene glycol dimethyl ether, tetrahydrofuran, tetrahydrofurfuryl ethers, such as tetrahydrofurfuryl methyl ether, and tertiary amines.

Hydrogenation of the vinyl groups present in the SBC can be carried out under conditions such that at least 80 mol %, at least 90 mol %, or at least 98 mol % of the vinyl groups are reduced, and 0-10 mol % of the arene double bonds are reduced. A suitable catalyst based on nickel, cobalt or titanium is used in the hydrogenation step.

Properties of the SBC:

The SBCs described above have useful physical properties that makes them valuable for high performance applications. They can be injection molded or extruded using conventional plastics processing equipment, with or without a curing agent. The SBCs have a unique adhesion and damping performance around room or outdoor temperatures and the SBC maintain excellent cohesion from those temperatures to quite higher temperatures, for example, at or above 80° C. or 90° C. The elastic properties make them good base polymers for adhesives, especially for high temperature applications. They also exhibit low long-term deformation while still retain elasticity at higher temperatures. The SBCs also have good damping property, which makes them useful in applications requiring good sealing performance or vibration damping.

The SBCs can be evaluated for their mechanical and viscoelastic properties using a DMA (Dynamic Mechanical Analyzer), particularly their peak tan delta temperatures, and variation of elastic modulus as a function of temperature.

The tan delta behavior and the extrapolated rubbery elastic modulus plateau of an example SBC is illustrated in FIG. 1, where the rubbery elastic modulus plateau is represented by the approximately horizontal line. FIG. 1 shows that the elastic modulus (G') of the SBC remains essentially unchanged over a temperature range from about 20° C. to about 130° C. FIG. 1 also illustrates that the temperature where the SBC exhibits a 10% loss in G' relative to the elastic plateau modulus is 142° C. Depending on the requirements of a given application, the temperature at which a 10% loss in elastic modulus is observed can serve as a guide for selecting an SBC. In an embodiment, the tangent delta maximum at a temperature between −40° C. and +10° C., at 10 rad/s angular frequency, as measured in accordance with ASTM D4065. In another embodiment, the SBC exhibits a 10% loss in elastic modulus relative to an extrapolated rubbery elastic modulus plateau at a temperature greater than 110° C., preferably greater than 115° C., more preferably greater than about 125° C.

Thermoplastic Elastomer Compositions Prepared Using the SBCs:

The SBC described above is useful for producing a variety of thermoplastic elastomer (TPE) compositions. In an embodiment, the composition is a TPE blend of the SBC with one or more components selected from (a) at least one plasticizer, (b) at least one tackifying resin, (c) at least one additive, (d) at least one filler, and (e) at least one plastic material. In some embodiments, the preferred components (a) and/or (b) are those that are miscible with the rubber phase of the SBC. The plasticizer can be for example, paraffinic oil. In an embodiment, the TPE blend comprises 99 wt. %-1 wt. % of the SBC and 1 wt. %-99 wt. % of one or more components selected from (a), (b), (c), (d), and (e). In other embodiments, the TPE blend can comprise components (a), (b), together with up to 20 wt. % of component (c), up to 400 phr (parts per hundred) of component (d) per 100 parts of the SBC, and up to 1000 phr of component (e) per 100 parts of the SBC. In an embodiment, the composition is preferably a blend of the SBC with one or more components selected from components (a)-(e), where (a) is miscible with the rubber phase of the SBC, and (b) is miscible with the rubber phase of the SBC. Preferred plastics (component (e)) include polypropylene, polyethylene, and polystyrene. Other plastic materials that can be used include polyamides, copolyesters, thermoplastic polyurethanes, polyphenylene ethers, or styrene copolymers with comonomers such as acrylonitrile and methacrylates, or mixtures of the foregoing plastics.

Other types of additives can also be included, such as a lubricant, an oil, or one or more of other additives, such as a heat stabilizer, a photo-stabilizer, an ultraviolet absorber, an antioxidant, a colorant, an antistatic agent, a flame retardant, a water repellent, a water-proofing agent, a hydrophilicity-imparting agent, an electrical conductivity-imparting agent, a thermal conductivity-imparting agent, an electromagnetic wave shielding property-imparting agent, a translucency adjuster, a fluorescent agent, a sliding property-imparting agent, a transparency-imparting agent, an anti-blocking agent, a metal deactivator, and an antibacterial agent, so long as they will not adversely affect the intended use.

In an embodiment, the TPE blends described above do not comprise a crosslinking agent, or alternatively, substantially free of, or containing less than 0.01 wt. % of the crosslinking agent.

Uses of the SBC and the TPE Composition:

The various physical properties described above makes the SBC polymer as well as the TPE compositions comprising the SBC valuable for making various articles. In an embodiment, the compositions are valuable for making adhesive compositions, particularly for high temperature applications. Another use of the SBC is for making a vibration damping composition, both for outdoor and indoor applications, particularly where the service temperature is above ambient.

The TPE compositions can be produced by mixing the SBC with the desired ingredients as described above by using a device such as a Henschel mixer, a V blender, a ribbon blender, etc. Alternatively, the compositions can be obtained by using a single screw or twin screw extruder, a kneader, or the like. The resultant resin composition can be pelletized.

EXAMPLES

The following test methods can be used.

Polymer molecular weights can be determined by gel permeation chromatography (GPC) using polystyrene calibration standards according to ASTM 5296-11. Polymer samples were dissolved in THF and run on the appropriate column set using both RI and UV detectors. The obtained peak polystyrene equivalent molecular weight values are reported here as GPC Mw data or simply Mp data. Coupling efficiency (relative to the coupling agent used in the preparation of the SBC) was determined by GPC from the peak integration. Coupling efficiency is the ratio (expressed in %) of the sum of the peak integration of the coupled species (with n>1) with the sum of the peak integration of the coupled and uncoupled species (n>0).

Proton NMR methodology was used to determine the total aromatic content (PSC), and the vinyl units content in the non hydrogenated block copolymer. The DPE content in the A block was determined by Proton NMR on the isolated A block.

Glass transition temperature ($T_g$) of all polymer samples were measured by Dynamic Mechanical Analysis (DMA) according to ASTM4065. Temperature sweep experiments were conducted from −80° C. to 200° C., where storage moduli (G'), loss moduli (G") and loss factors (tan δ) were obtained as a function of temperature. All DMA experiments were progressed at a frequency of 10 rad/s or 1.6 Hz. $T_g$ is reported as the temperature at the peak value of tan δ. The extrapolated rubbery plateau line is drawn into a $\log_{10}(G')$ vs temperature graphic. It is the line fitting to the G' values in its most linear part between the rubber Tg and the rigid end-block Tg. We define the measured block copolymer maximum usage temperature as the DMA temperature where the measured G' is 10% below the extrapolated rubbery plateau line. Both the tan delta behavior and the extrapolated rubbery plateau line of an example block copolymer is illustrated in FIG. 1. FIG. 1 shows the rubber Tg or T(tan delta$_{max}$) to be measured at −16° C. and shows that the elastic modulus (G') of the block copolymer remains essentially linear over a temperature range from about 30° C. to about 130° C. FIG. 1 also illustrates that the temperature where the block copolymer exhibits a 10% loss in G' relative to the extrapolated rubbery plateau line is about 142° C. Depending on the requirements of a given application, the temperature at which a 10% loss in elastic modulus is observed can serve as a guide for selecting block copolymer for their maximum temperature use.

Specimen composed of the listed block copolymers were prepared using three different methods. The compression molding method consists into pressing the produced block copolymer under high pressure at 180° C. into 1 mm plates. The injection molding method with melt temperature reaching 180° C.-200° C. The solvent casting method consists of dissolving the block copolymer into toluene at room temperature into a 10 wt. % solution. The homogeneized solution is poured into siliconized tray to reach close to 10 mm layer and allowed to evaporate at slow rate. Once the solvent is evaporated, the resulting cast elastomeric plate is further dried into a vacuum oven at 40° C. for one night to ensure the full toluene evaporation.

Tensile stress-strain properties were measured with 3 different standards. Dumbbell shaped specimen were stamped out of the solvent cast plate or compression molded plate using dumbbells ISO37/2 and the tensile tests was carried out at an extension rate of 500 mm/min at 25° C. or 80° C. Dumbbell shaped specimen were stamped out of the solvent cast plate or compression molded plate using dumbbells ISO37/3 and the tensile tests was carried out at an extension rate of 300 mm/min at 25° C. or 80° C. The third method used was French standard NF T 46-002 with an extension rate of 100 mm/min. Three values were recorded on the stress-strain curves: the stress at 100% elongation (MOD100%), the stress at break (SaB) and the Elongation at Break (EaB).

Polymers Comp1-Comp5 are comparative examples whose features are shown in Tables 1 and 2. Comp1 and Comp2 are commercially available coupled styrene-butadiene and styrene-isoprene block copolymers having coupling efficiencies of 82% and 84%, respectively and GPC Mp for the main peak of 410 kg/mol and 210 kg/mol respectively. The coupling agents used are those known in the art, e.g., including diethyladipate, bisphenol A epichlorohydrin resin, divinylbenzene, and methyltrimethoxysilane.

Preparation of Polymer Comp3. Ingredients used are dried and/or purged with nitrogen before use. In a pressure proof stainless steel reactor dried and flushed with inert gas, was added sequentially: 6 liters of cyclohexane that were heated at 50° C.; 70 ml of sec-butyllithium at 0.12 mol/l and 123 g of purified styrene. The reaction was allowed to proceed for 74 minutes after which 14 g additional styrene was added. 52 minutes later, 773 g of isoprene was added over a period of 21 minutes. 1 minute after the start of the isoprene addition, 2.2 ml of 1,2-diethoxypropane was added. 2 hours after the start of isoprene addition 3.8 ml of divinylbenzene was added and the reaction mixture was heated to 60° C. After 87 minutes, 1.2 ml of ethylhexanol was added. The resulting coupled and non-reactive polymer solution was precipitated into water. The non-coupled arm had a GPC Mp of 201 kg/mol and the major species had a GPC Mp of 828 kg/mol.

Preparation of Polymer Comp4. In a pressure proof stainless steel reactor dried and flushed with inert gas (reactor1) was added sequentially: 0.18 liter of cyclohexane; 9.05 g of 1,1-diphenylethylene; 74 mg of diethylether that were heated to 50° C. Next 15 ml of sec-butyllithium at 0.16 mol/l was added followed by slow addition of 30.5 g of purified styrene. After two hours 190 g of the resulting solution was transferred to another pressure proof stainless steel reactor dried and flushed with inert gas (reactor2). The reactor2 contained 1.06 liter of dried cyclohexane; 0.37 ml of 1,2-diethoxypropane; 25.5 g of a mixture of 60 wt. % isoprene and 40 wt. % butadiene. 1.5 ml of sec-butyllithium was added to reactor2, then heated at 50° C. few minutes followed by adding the contents of reactor1. Next was added slowly over 30 minutes, 115 g of a mixture of 60 wt. % isoprene and 40 wt. % butadiene. The temperature was allowed to reach 70° C.; an hour later, 15 g of butadiene was added and and after 1 minute, 6 ml of 0.12 mol/1 of methyltrimethoxysilane. Finally 0.1 ml of 2-ethylhexanol was added to the reactor. The resulting coupled and non-reactive polymer solution was precipitated into water. The non-coupled arm had a GPC Mp of 127 kg/mol and the major species had a GPC Mp of 388 kg/mol.

Preparation of Polymer Comp5. In reactor1 was added sequentially: 0.18 liter of cyclohexane; 9.0 g of 1,1-diphenylethylene; 78 mg of diethylether that were heated to 50° C. 16 ml of sec-butyllithium at 0.23 mol/1 was added and 31.3 g of purified styrene was slowly added over 14 minutes. After 90 minutes 68 g of the resulting solution was transferred to reactor2. The reactor2 contained 1.09 liter of dried cyclohexane; 0.39 ml of 1,2-diethoxypropane; 8.8 g of a mixture of 60 wt. % isoprene with 40 wt. % of butadiene. 1 ml of sec-butyllithium was added to reactor2 then heated at 50° C. few minutes before to add the reactor1 transference. The further additions to reactor2: slow addition over 30 minutes of 119 g of a mixture of 60 wt. % isoprene with 40 wt. % of butadiene and the temperature was allowed to reach 70° C. subsequently, the reaction was allowed to proceed for 30 minutes. Finally 38.4 g of styrene was added and 23 minutes later the reactive species were terminated with methanol. The resulting non-reactive polymer solution was precipitated into water. The major polymer species had a GPC Mp of 184 kg/mol. Polymers P1-P8 are examples whose features are shown in Tables 1 and 2.

Preparation of exemplary polymer P1. In reactor1 was added sequentially: 0.18 liter of cyclohexane; 9.2 g of 1,1-diphenylethylene; 95 mg of diethylether; 11 ml of sec-butyllithium (0.17 mol/L); that were heated at 50° C. 31.8 g of styrene was slowly added. After two hours 147 g of the resulting solution was transferred to reactor2. The reactor2 contained 1.1 liter of dried cyclohexane; 0.47 ml of 1,2-diethoxypropane; 32.9 g of isoprene. 1.3 ml of sec-butyllithium was added to reactor2 then heated at 50° C. few minutes before to add the reactor1 transference. The further additions to reactor2: slow addition over 30 minutes of 119.6 g of isoprene. Finally 0.67 ml of divinylbenzene was added and the temperature was increased to 70° C. 1 h later 0.23 ml of 2-ethylhexanol was added. The resulting coupled and non-reactive polymer solution was precipitated into water. The non-coupled arm had a GPC Mp of 185 kg/mol and the major species had a GPC Mp of 686 kg/mol.

Preparation of exemplary polymer P2. In reactor1 was added sequentially: 0.2 liter cyclohexane; 9.16 g of 1,1-diphenylethylene; 96 mg of diethylether; 12 ml of sec-butyllithium (0.17 mol/L); that were heated at 50° C. 31.8 g of styrene was slowly added followed by 3.1 g of isoprene (2.5 hours after the start of the reaction). 20 minutes later 155 g of the resulting solution was transferred to reactor2. The reactor2 contained 1.1 liter of dried cyclohexane; 0.3 ml of 1,2-diethoxypropane; 23.2 g of styrene; 130.2 g of isoprene. 0.5 ml of sec-butyllithium was added to reactor2 then heated at 50° C. few minutes before to add the reactor1 transference. After an hour reaction time, 0.72 ml of divinylbenzene was added and the temperature was increased to 70° C. followed 1 h later by 0.1 ml of methanol. The resulting coupled and non-reactive polymer solution was precipitated into water. The non-coupled arm had a GPC Mp of 190 kg/mol and the major species had a GPC Mp of 1116 kg/mol. Preparation of exemplary polymer P3. In reactor1 was added sequentially: 0.18 liter of cyclohexane; 9.19 g of 1,1-diphenylethylene; 96 mg of diethylether; 12 ml of sec-butyllithium at 0.17 mol/L; that were heated at 50° C. 31.7 g of styrene was slowly added over 34 minutes. After 140 minutes 134 g of the resulting solution was transferred to reactor2. The reactor2 contained 1.1 liter of dried cyclohexane; 0.47 ml of 1,2-diethoxypropane; 152.4 g of isoprene. 0.5 ml of sec-butyllithium and was then heated at 50° C. few minutes before to add the reactor1 transference. After 90 minutes 0.72 ml of divinylbenzene was added and the temperature was increased to 70° C. followed 140 minutes later by 0.10 ml of methanol. The resulting coupled and non-reactive polymer solution was precipitated into water. The non-coupled arm had a GPC Mp of 198 kg/mol and the major species had a GPC Mp of 826 kg/mol.

Preparation of exemplary polymer P4. In reactor1 was added sequentially: 0.2 liter of cyclohexane; 9.19 g of 1,1-diphenylethylene; 104 mg of diethylether; 12 ml of sec-butyllithium at 0.14 mol/L; that were heated at 50° C. 31.4 g of styrene was slowly added over 28 minutes. After three hours 183 g of the resulting solution was transferred to reactor2. The reactor2 contained 1.1 liter of dried cyclohexane; 0.3 ml of 1,2-diethoxypropane; 116.3 g of isoprene. 0.5 ml of sec-butyllithium was added to reactor2 then heated at 60° C. few minutes before to add the reactor1 transference. After 104 minutes 2.7 g isoprene was added after which 0.70 ml of divinylbenzene was added followed 123 min later by 0.10 mL of methanol. The resulting coupled and non-reactive polymer solution was precipitated into water. The non-coupled arm had a GPC Mp of 158 kg/mol and the major species had a GPC Mp of 787 kg/mol. Its structural characteristics measured in GPC, NMR or others are listed in Tables 1 and 2.

Preparation of exemplary polymer P5. In reactor1 was added sequentially: 0.2 liter of cyclohexane; 11.94 g of 1,1-diphenylethylene; 108 mg of diethylether; 13 ml of sec-butyllithium at 0.16 mol/L; that were heated at 50° C. 27.8 g of styrene was slowly added over 30 minutes. After 140 minutes 168 g of the resulting solution was transferred to reactor2. The reactor2 contained 1.1 liter of dried cyclohexane; 0.46 ml of 1,2-diethoxypropane; 150 g of isoprene. 0.5 ml of sec-butyllithium was added to reactor2 then heated at 50° C. few minutes before to add the reactor1 transference. After 90 minutes 0.80 to ml of divinylbenzene was added and the reaction mixture was heated to 70° C. followed 150 min later by 0.10 ml of methanol. The resulting coupled and non-reactive polymer solution was precipitated into water. The non-coupled arm had a GPC Mp of 163 kg/mol and the major species had a GPC Mp of 794 kg/mol.

Preparation of exemplary polymer P6. In reactor1 was added sequentially: 0.2 liter of cyclohexane; 9.19 g of 1,1-diphenylethylene; 95 mg of diethylether; 10 ml of sec-butyllithium (0.15 mol/L); that were heated at 50° C. 32.2 g of styrene was slowly added over 30 minutes. After two and a half hours 184 g of the resulting solution was transferred to reactor2. The reactor2 contained 1.1 liter of dried cyclohexane; 0.30 ml of 1,2-diethoxypropane; 21.3 g of styrene, 115.2 g of isoprene; all heated to 60° C. 0.5 ml of sec-butyllithium was added to reactor2 for few minutes before to add the reactor1 transference. After 74 minutes 3.8 g of isoprene was added followed subsequently by 0.70 mL of divinylbenzene after which the temperature was increased to 70° C. 150 min later 0.10 ml of methanol was added. The resulting coupled and non-reactive polymer solution was precipitated into water. The non-coupled arm had a GPC Mp of 191 kg/mol and the major species had a GPC Mp of 922 kg/mol.

Preparation of exemplary polymer P7. In reactor1 was added sequentially: 0.2 liter of cyclohexane; 11.96 g of 1,1-diphenylethylene; 86 mg of diethylether; 13 ml of sec-butyllithium at 0.16 mol/L; that were heated at 50° C. 28.3 g of styrene was slowly added over 30 minutes and reacted for 90 minutes before to add 9.5 g of isoprene. After one hour 160 g of the resulting solution was transferred to reactor2. The reactor2 contained 1.1 liter of dried cyclohexane; 0.30 ml of 1,2-diethoxypropane; 21.3 g of styrene, 119.7 g of isoprene; all heated at 60° C. 0.5 ml of sec-butyllithium was added to reactor2 for few minutes, then the contents of reactor1 was added. After 80 minutes 2.8 g of isoprene was added and subsequently divinylbenzene (0.70 mL). The temperature was increased to 70° C. followed 150 min later by 0.10 ml of methanol. The resulting coupled and non-reactive polymer solution was precipitated into water. The non-coupled arm had a GPC Mp of 167 kg/mol and the major species had a GPC Mp of 840 kg/mol.

Preparation of exemplary polymer P8. In reactor1 was added sequentially: 0.24 liter of cyclohexane; 14.5 g of 1,1-diphenylethylene; 133 mg of diethylether; 19 ml of sec-butyllithium at 0.16 mol/L; all heated at 50° C. 33.9 g of styrene was slowly added over 30 minutes and reacted for 53 minutes before to add 45.4 g of butadiene. The temperature was increased to 70° C. and after 43 minutes 283 g of the resulting solution was transferred to reactor2. The reactor2 contained 1.0 liter of dried cyclohexane; 0.43 ml of 1,2-diethoxypropane; 22.5 g of styrene, 23.4 g of butadiene; all heated at 50° C. 0.6 ml of sec-butyllithium was added to reactor2 for few minutes before to add the reactor1 transference. Further 53.2 g of butadiene was slowly added over a 40 minute period. 6 ml methyltrimethoxysilane at 0.19 mmol/ml was added, the temperature increased to 70° C. and two and a half hours later 0.10 ml of methanol was added. The resulting coupled and non-reactive polymer solution was precipitated into water. The non-coupled arm had a GPC Mp of 103 kg/mol and the major species had a GPC Mp of 206 kg/mol.

Three adhesive formulations were produced in toluene solutions by mixing the considered example polymer with a narrow molecular weight distribution, aliphatic C5 resin: Piccotac™ 1095 resin ex Eastman, with a naphthenic process oil: Nyflex™ 223 oil ex. Nynas and with an antioxidant: Irganox™1010 antioxidant ex BASF. The ratio polymer/side ingredients was kept constant but the weight ratio of plasticizer to C5 tackifier was adapted to reach similar rubber phase Tg as known to those skilled in the art, and this to reach close adhesion performance at room temperature (see table 7). The resulting solutions were coated onto PET backing at coating weight of 25 g adhesive per square meter.

Adhesive tests details: 180° Peel Adhesion (180° PA) was measured on stainless steel according to FTM1. Holding Power (HP) was measured according to FTM8 at 23° C. on 12.5 mm*25 mm adhesion surface on stainless steel and weight of 2 kg. Shear Adhesion Failure Temperature (SAFT) was run as per ASTM D4498. A 25 mm×25 mm of adhesive contact was applied to a standard stainless steel panel and then placed in an oven starting at 25° C. A 500 g weight was applied to the adhesive and the temperature was continuously raised at a linear rate of 22° C. by hour. The temperature at which the adhesive sample failed was recorded.

In the Tables below, the following terms/abbreviations are used: St: polystyrene block. (Bd/Ip): random copolymer block of isoprene and butadiene. A is a polymer block corresponding to A block definition, B is a polymer block corresponding to B block definition and C is a polymer block corresponding to C block definition as found in claim 1&7. In Table 1, "X" is the residue of coupling agent that couples several arms ('n' arms) together. The succession of blocks composing each arm is as described by the notations within the square brackets.

TABLE 1

Styrenic block copolymers.

| Polymer | SBC block structure | Coupling efficiency |
|---|---|---|
| Comp1 | [S-Bd-]nX | 83 |
| Comp2 | [S-Ip-]nX | 83 |
| Comp3 | [St-B]nX | 90 |
| Comp4 | [A-(Bd/Ip)-]nX | 93 |
| Comp5 | A-(Bd/Ip)-St | NA |
| P1 | [A-B-]nX | 91 |
| P2 | [A-B-]nX | 91 |
| P3 | [A-B-]nX | 91 |
| P4 | [A-B-]nX | 90 |
| P5 | [A-B-]nX | 94 |
| P6 | [A-C-B-]nX | 92 |
| P7 | [A-C-B-]nX | 92 |
| P8 | [A-C-B-]nX | 89 | relative to the total weight of the polymerized 1,3-diene in the SBC. St refers to polystyrene block. Mp refers to peak molecular weight as measured in GPC calibrated with polystyrene standards.

TABLE 4

DMA properties of the styrenic block copolymers.

| Polymer | Temperature where rubber tan delta is maximum ° C. | Temperature where G' = 0.9*G' extrapolated rubber plateau line ° C. |
|---|---|---|
| Comp1 | −84 | 51 |
| Comp2 | −51 | 95 |
| Comp4 | −47 | 120 |
| Comp5 | −41 | 78 |
| Comp3 | −17 | 115 |
| P8 | −29 | 115 |
| P2 | −23 | 139 |
| P4 | −21 | 133 |
| P5 | −18 | 131 |
| P1 | −18 | 133 |
| P7 | −18 | 130 |
| P6 | −17 | 130 |
| P3 | −16 | 142 |

TABLE 2

Features of the styrenic block copolymers.

| Polymer | DPE content in A block Wt. % | A block Mp kg/mol | Mp of St block kg/mol | Isoprene content in B block dienes Wt. % | Butadiene content in B block dienes Wt. % | V Wt. % | S Wt. % | DPE content in (St + A) Wt. % | content of A block in polymer Wt. % | Styrene block content in polymer Wt. % |
|---|---|---|---|---|---|---|---|---|---|---|
| Comp1 | NA | NA | 20 | NA | NA | <10 | 0 | NA | 0 | ~30 |
| Comp2 | NA | NA | 16 | NA | NA | <10 | 0 | NA | 0 | ~22 |
| Comp3 | NA | NA | 20 | 100 | 0 | 46 | 0 | NA | 0 | 15 |
| Comp4 | 23 | 18 | NA | NA | NA | 33 | 0 | 23 | 23.5 | 0 |
| Comp5 | 23 | 11 | 29 | NA | NA | 39 | 0 | 7 | 10 | 22 |
| P1 | 23 | 19 | NA | 100 | 0 | 48 | 0 | 23 | 17 | 0 |
| P2 | 22 | 18 | NA | 100 | 0 | 29 | 15 | 22 | 15 | 0 |
| P3 | 23 | 17 | NA | 100 | 0 | 50 | 0 | 23 | 15 | 0 |
| P4 | 23 | 18 | NA | 100 | 0 | 26 | 13 | 23 | 18 | 0 |
| P5 | 30 | 16 | NA | 100 | 0 | 49 | 0 | 30 | 17 | 0 |

TABLE 3

Features of the styrenic block copolymers which have an additional C block.

| Polymer | DPE content in A block Wt. % | A block Mp kg/mol | Isoprene content in B block dienes Wt. % | Butadiene content in B block dienes Wt. % | V Wt. % | S Wt. % | C block Mp kg/mol | DPE content in (St + A) Wt. % | content of A block in polymer Wt. % | Styrene block content in polymer Wt. % |
|---|---|---|---|---|---|---|---|---|---|---|
| P6 | 22 | 21 | 100 | 0 | 32 | 16 | 2 | 22 | 18 | 0 |
| P7 | 30 | 15 | 100 | 0 | 29 | 15 | 4 | 30 | 15 | 0 |
| P8 | 30 | 14 | 0 | 100 | 44 | 23 | 16 | 30 | 24 | 0 |

"S" refers to the wt. % styrene content relative to the total weight of the B blocks, or the B and C blocks in the SBC. "CE" is coupling efficiency. "V" refers to the wt. % 1,3-diene content having pendant 1,2- and/or 3,4-vinyl groups, Polymers according to the invention displayed both high rubber Tg (above −40° C.) and showed a rubber plateau extending to high temperatures with a drop starting above 100° C.

TABLE 5

Processability and tensile properties at RT and 80° of Styrenic block copolymers.

| Property | Physical parameter | Unit | Comp1 | Comp2 | P4 | P3 |
|---|---|---|---|---|---|---|
| Dynamic Mechanical Analysis | Rubber Tan Delta max Temp | ° C. | −84.5 | −52 | −21.3 | −16.3 |
| | Temperature where $G' = 0.9*G'_{plateau}$ | ° C. | 51 | 95 | 133 | 142 |
| RT Tensile | Sample preparation | | CM | CM | CM | CM |
| | SaB | MPa | 3.2 | 21.4 | 19.7 | 11.3 |
| | EaB | % | 218 | 1377 | 1153 | 1027 |
| | SaB-Mod100% | MPa | 1.0 | 19.8 | 18.8 | 10.6 |
| 80° C. Tensile (max 470% elongation) | Sample preparation | | Solvent | Solvent | Solvent | Solvent |
| | SaB | MPa | NM | 0.8 | >1.6 | >1.5 |
| | EaB | % | NM | 365 | >470 | >470 |
| | SaB-Mod100% | MPa | NM | 0.0 | >1 | >0.9 |
| 80° C. Tensile (on shorter sample) | SaB | MPa | 5.77 | NM | 2.71 | 2.73 |
| | EaB | % | 1072 | NM | 1096 | 1075 |
| | SaB-Mod100% | MPa | 4.32 | NM | 2.22 | 2.25 |

SaB: Stress at break.
EaB: Elongation at break.
SaB-Mod100%: Difference between stress at break and stress at 100% elongation.
NM: Not measured.

Comp1 polymer leads to low performance in tensile test measured on compression molded test. Its rubber composition does not allow it to reach sufficient melt processability. Comp2 polymer like P3 and P4 show good resistance in tensile test at room temperature. Those polymers despite their high Mw show good compression molding capabilities and good mechanical resistance with high elongation at break at room to temperature. Comp2 sample when measured at 80° C. instead of 23° C. leads to low resistance and low elongation at break without any hardening between 100% elongation and its break point. On the other hand, P3 and P4 gave high elongation at break, decent strength, and positive strain hardening.

Table 6 data shows that in an embodiment, the polymers demonstrated the possibility to be injected, and exhibited valuable mechanical resistance at room temperature with high elongation at break and strong strain hardening. When measured at 90° C., the same polymers according to another embodiment maintained a significant part of their strength and still showed the strain hardening behavior (SaB-Mod100%>0), demonstrating their elastic resistance under stress.

TABLE 7

Pressure sensitive adhesive compositions and their performance.

| Composition | | Adhesive Comparative1 | Adhesive Example1 | Adhesive Example2 |
|---|---|---|---|---|
| Polymer name | | Comp2 | P1 | P4 |
| Polymer (parts) | | 100 | 100 | 100 |
| Piccotac 1095 (parts) | | 125 | 95 | 100 |
| Nyflex 223 (parts) | | 15 | 45 | 40 |
| Irganox 1010 (parts) | | 3 | 3 | 3 |
| Total (parts) | | 243 | 243 | 243 |
| Measured adhesive properties | | | | |
| 180° PA | N/25 mm | 21 | 18 | 19 |
| HP | min | >6000 | 2900 | >6000 |
| SAFT | ° C. | 126 | 151 | 146 |

Adhesive formulations were adjusted to get similar formulation rubber phase Tg and so for those skilled in the art similar adhesion performance. This explains the very similar measured peel adhesion (PA) values on those three adhesive formulations. The two adhesives according to the invention show quite higher shear adhesion failure temperature (SAFT) values (indicating better shear resistance at high temperature), thus demonstrating better temperature performance while providing good adhesion around room temperature, despite the higher loading of plasticizer. Other aspects of the invention are described hereinbelow.

In a first aspect, a tire comprises a polymeric composition comprising at least one thermoplastic block elastomer comprising at least one elastomer block and at least one thermoplastic block, in which each elastomer block comprises at least 70% by weight of units derived from isoprene, relative to the weight of said elastomer block, and at least one thermoplastic block comprises 40 to 80% by weight of units derived from one or more styrenic monomers and 20 to 60% by weight of units derived from diphenylethylene, relative to the weight of said thermoplastic block.

A second aspect is a tire according to the above first aspect, characterized in that the thermoplastic block elastomer comprises at least one elastomeric block comprising units derived from styrenic monomers.

A third aspect is a tire according to the above second aspect, characterized in that the units derived from styrenic monomers in said elastomeric block represent 10 to 20% by weight of the elastomeric block.

A fourth aspect is a tire according to any one of the preceding aspects, characterized in that the thermoplastic elastomer comprises at least one elastomeric block consisting of units derived from isoprene and units derived from one or more styrenic monomers.

A fifth aspect is a tire according to any one of the preceding aspects, characterized in that the thermoplastic elastomer comprises at least one elastomeric block consisting of units derived from isoprene.

A sixth aspect is a tire according to any one of the preceding aspects, characterized in that the thermoplastic elastomer comprises at least one elastomeric block to consisting of units derived from isoprene and at least one elastomeric block consisting of units derived from isoprene. and units derived from one or more styrenic monomers.

A seventh aspect is a tire according to any one of the preceding aspects, characterized in that the thermoplastic block elastomer is such that each thermoplastic block comprises 40 to 80% by weight of units derived from one or more styrenic monomers and 20 to 60% by weight of units derived from diphenylethylene, relative to the weight of said thermoplastic block.

An eighth aspect is a tire according to any one of the preceding aspects, characterized in that the thermoplastic block comprises 65 to 80% by weight of units derived from one or more styrenic monomers and 20 to 35% by weight of units derived from diphenylethylene, relative to the weight of said thermoplastic block.

A ninth aspect is a tire according to any one of the preceding aspects, characterized in that the styrenic monomer or monomers are chosen from styrene, o-, m- or p-methylstyrene, alpha-methylstyrene, beta-methylstyrene, 2,6-dimethylstyrene, 2,4-dimethylstyrene, alpha-methyl-o-methylstyrene, alpha-methyl-m-methylstyrene, alpha-methyl-p-methylstyrene, beta-methyl-o-methylstyrene, beta-methyl-m-methylstyrene, beta-methyl-p-methylstyrene, 2,4,6-trimethylstyrene, alpha-methyl-2,6-dimethylstyrene, alpha-methyl-2, 4-dimethylstyrene, beta-methyl-2,6-dimethylstyrene, beta-methyl-2,4-dimethylstyrene, o-, m- or p-chlorostyrene, 2,6-dichlorostyrene, 2,4-dimethylstyrene, dichlorostyrene, alpha-chloro-o-chlorostyrene, alpha-chloro-m-chlorostyrene, alpha-chloro-p-chlorostyrene, beta-chloro-o-chlorostyrene, beta-chloro-m-chlorostyrene, beta-chloro-p-chlorostyrene, 2,4,6-trichlorostyrene, alpha-chloro-2,6-dichlorostyrene, alpha-chloro-2,4-dichlorostyrene, beta-chloro-2,6-dichlorostyrene, beta-chloro-2,4-dichlorostyrene, o-, m- or p-butylstyrene, o-, m- or p-methoxystyrene, o-, m- or p-chloromethylstyrene, o-, m- or p-bromomethylstyrene, styrene derivatives substituted with a silyl group, preferably the styrenic monomer is styrene.

A tenth aspect is a tire according to any one of the preceding aspects, characterized in that the thermoplastic elastomer represents 15 to 100 phr of the polymeric composition.

An eleventh aspect is a tire according to any one of the preceding aspects, comprising a tread, characterized in that said polymeric composition is present in all or part of the tread.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 6

Processability and tensile properties at RT and 90° C. of Styrenic block copolymers.

| Property | Physical parameter | Unit | P1 | P2 | P6 | P7 | P5 | Comp2 | Comp3 | Comp4 | Comp5 |
|---|---|---|---|---|---|---|---|---|---|---|---|
| DMA | Rubber Tan Delta max Temperature | ° C. | −18.3 | −22.3 | −17.3 | −18.3 | −18.3 | −52 | −17.3 | −47.3 | −41.3 |
|  | Temperature where $G' < 0.9\ G'_{plateau}$ | ° C. | 133 | 139 | 130 | 130 | 131 | 95 | 115 | 120 | 78 |
|  | Sample preparation process |  | Injection | Injection | Injection | Injection | Injection | CM | CM | CM | Injection |
| RT Tensile | SaB | MPa | 7 | 10 | 6 | 12.5 | 7 | 21.5 | 11 | 10 | 25 |
|  | EaB | % | 700 | 760 | 550 | 880 | 570 | 1800 | 660 | 200 | 930 |
|  | Mod100% | MPa | 2 | 3 | 2.5 | 2.5 | 2.5 | 2.5 | 2.8 | 9 | 8 |
|  | SaB-Mod100% | MPa | 5 | 7 | 3.5 | 10 | 4.5 | 19 | 8.2 | 1 | 17 |
| 90° C. Tensile | SaB | MPa | 2.5 | 3.5 | 2.5 | 2.5 | 3 | 1.2 | 1.6 | 5.5 | 2 |
|  | EaB | % | 350 | 200 | 350 | 355 | 340 | 400 | 290 | 120 | 180 |
|  | Mod100% | MPa | 2 | 3 | 2.3 | 2.2 | 2.25 | 1.8 | 2.1 | 6 | 2.1 |
|  | SaB-Mo100% | MPa | 0.5 | 0.5 | 0.2 | 0.3 | 0.8 | −0.6 | −0.5 | −0.5 | −0.1 |

CM: Compression molding.

The invention claimed is:

1. A styrenic block copolymer having one or more polymer blocks A and one or more polymer blocks B and having a formula selected from: A-B-A, A-B-B-A, (A-B-A)$_n$X, (A-B)$_n$X, or mixtures thereof, wherein
n is from 2 to 30, X is residue of a coupling agent;
the block copolymers containing at least two blocks A connected by at least one block B representing more than 50 wt. % of the styrenic block copolymer;
each one or more A block independently is a polystyrene block having:
a 1,1-diphenylethylene content from about 10 wt. % to about 63 wt. %, relative to the weight of the A block,
a molecular weight from about 5 kg/mol to about 40 kg/mol, and
a weight content relative to the weight of the styrenic block copolymer, of about 10 wt. % to about 40 wt. %;
each one or more B block independently is a poly(1,3-diene-styrene) block derived from 1,3-diene units and styrene units, the poly(1,3-diene-styrene) block comprises an isoprene-rich block, a butadiene-rich block, or combinations of both blocks, wherein
the polymerized 1,3-diene units having pendant 1,2- and/or 3,4-vinyl groups correspond to a wt. % content "V" as relative to the total weight of the polymerized 1,3-diene in the one or more B blocks,
the styrene unit having wt.% content "S" as relative to total weight of the one or more B blocks,
the isoprene-rich block if present comprises more than 90 wt. % of polymerized isoprene units relative to the weight of the polymerized 1,3-diene, with S having a value of 0 to about 40, and (S+V) having a value of about 18 to about 75,
the butadiene-rich block if present comprises more than 90 wt. % of polymerized butadiene units relative to the weight of the polymerized 1,3-diene, with S having a value of 0 to about 40, and (1.2*S+V) having a value about 60 to about 120.

2. The styrenic block copolymer of claim 1, wherein the block copolymer is hydrogenated, and wherein subsequent to hydrogenation, up to 10 percent of the aromatic double bonds have been hydrogenated, and at least 80 percent of the diene double bonds have been hydrogenated.

3. The styrenic block copolymer of claim 2, wherein each one or more A block independently has a molecular weight from about 10 kg/mol to 20 kg/mol.

4. The styrenic block copolymer of claim 1, which exhibits a DMA tangent delta maximum at a temperature between −40° C. and +10° C., at 10 rad/s angular frequency, as measured in accordance with ASTM D4065.

5. The styrenic block copolymer of claim 1, which exhibits a 10% loss in elastic modulus relative to an extrapolated rubbery plateau modulus at a temperature greater than 110° C.

6. The styrenic block copolymer of claim 1, wherein each one or more A block independently has
a 1,1-diphenylethylene content from about 15 to about 60 wt. %, relative to the weight of the A block;
a molecular weight from about 10 kg/mol to about 25 kg/mol; and
a weight content relative to the weight of the styrenic block copolymer, of about 13 wt. % to about 25 wt. %; and
each one or more B block independently comprises
an isoprene-rich block if present comprising more than 90 wt. % of polymerized isoprene units relative to the weight of the polymerized 1,3-diene, with S having a value of 0 to about 25, and (S+V) having a value of about 25 to about 65;
a butadiene-rich block if present comprising more than 90 wt. % of polymerized butadiene units relative to the weight of the polymerized 1,3-diene, with S having a value of 10 to about 30, and (1.2*S+V) having a value of about 60 to about 100.

7. The styrenic block copolymer of claim 1,
wherein each one or more A block independently has a 1,1-diphenylethylene content from about 20 wt. % to about 50 wt. %, relative to the weight of the A block; and
n is from about 2 to about 10;
wherein the styrenic block copolymers comprising at least two A blocks connected by at least one B block represent more than 80 wt. % of the styrenic block copolymer.

8. The styrenic block copolymer of claim 1, further comprising one or more C blocks, wherein the C block is between the A block and the B block, and is a poly(1,3-diene) block substantially free of styrene units.

9. The styrenic block copolymer of claim 8, having a formula A-C-B-C-A or (A-C-B)$_n$X; wherein n is from 2 to 30, and X is residue of a coupling agent.

10. The styrenic block copolymer of claim 8, wherein the B and C blocks together comprise
a wt. % styrene content "$S_1$" relative to the weight of the one or more B and C blocks; and a wt. % 1,3-diene content having pendant 1,2- and/or 3.4-vinyl groups "$V_1$", relative to the weight of the polymerized 1,3-diene in the one or more B and C blocks;
wherein the one or more B and C blocks together comprise
an isoprene-rich block if present comprising more than 90 wt. % of polymerized isoprene units relative to the weight of the polymerized 1,3-diene, with $S_1$ having a value of 0 to about 40, and ($S_1$+$V_1$) having a value of about 18 to about 75;
a butadiene-rich block if present comprising more than 90 wt. % of polymerized butadiene units relative to the weight of the polymerized 1,3-diene, with $S_1$ having a value of 0 to about 40, and (1.2*$S_1$+$V_1$) having a value of about 60 to about 120.

11. The styrenic block copolymer of claim 1, wherein each one or more A block independently has a molecular weight from about 13 kg/mol to 26 kg/mol.

12. A thermoplastic elastomer blend comprising:
99%-1% of the styrenic block copolymer of claim 1, and
1%-99% of one or more components selected from (a) at least one plasticizer, (b) at least one resin, (c) at least one additive, (d) at least one filler, and (e) at least one plastic material.

13. An adhesive composition comprising the styrenic block copolymer of claim 1.

14. An adhesive composition comprising the styrenic block copolymer of claim 2.

15. An adhesive composition comprising the styrenic block copolymer of claim 8.

16. A sound or vibration damping composition comprising the styrenic block copolymer of claim 1.

17. A styrenic block copolymer having one or more polymer blocks A and one or more polymer blocks B and having a formula selected from: A-B-A, A-B-B-A, (A-B-A)$_n$X, (A-B)$_n$X, or mixtures thereof, wherein n is from 2 to 30, X is residue of a coupling agent;

the block copolymers containing at least two blocks A connected by at least one block B representing more than 50 wt. % of the styrenic block copolymer;

each one or more A block independently is a polystyrene block having:
- a 1,1-diphenylethylene content from about 10 wt. % to about 63 wt. %, relative to the weight of the A block,
- a molecular weight from about 5 kg/mol to about 40 kg/mol, and
- a weight content relative to the weight of the styrenic block copolymer, of about 13 wt. % to about 25 wt. %;

each one or more B block independently is a poly(1,3-diene-styrene) block derived from 1,3-diene units and styrene units, the poly(1,3-diene-styrene) block comprises an isoprene-rich block, a butadiene-rich block, or combinations of both blocks, wherein
- the polymerized 1,3-diene units having pendant 1,2- and/or 3,4-vinyl groups correspond to a wt.% content "V" as relative to the total weight of the polymerized 1,3- diene in the one or more B blocks,
- the styrene unit having wt.% content "S" as relative to total weight of the one or more B blocks,
- the isoprene-rich block if present comprises more than 90 wt. % of polymerized isoprene units relative to the weight of the polymerized 1,3-diene, with S having a value of 0 to about 25, and (S+V) having a value of about 25 to about 65, and
- the butadiene-rich block if present comprises more than 90 wt. % of polymerized butadiene units relative to the weight of the polymerized 1,3-diene, with S having a value of 10 to about 30, and (1.2*S+V) having a value of about 60 to about 100;

wherein the styrenic block copolymer exhibits a DMA tangent delta maximum at a temperature between -40° C. and +10° C., at 10 rad/s angular frequency, as measured in accordance with ASTM D4065.

* * * * *